United States Patent
Patil et al.

(10) Patent No.: US 11,864,026 B2
(45) Date of Patent: Jan. 2, 2024

(54) SYSTEMS AND METHODS FOR ACCESS BARRING BASED ON SLICE INFORMATION

(71) Applicant: Verizon Patent and Licensing Inc., Basking Ridge, NJ (US)

(72) Inventors: Sudhakar Reddy Patil, Flower Mound, TX (US); Lalit R. Kotecha, San Ramon, CA (US); Deepa Jagannatha, Bridgewater, NJ (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/025,082

(22) Filed: Sep. 18, 2020

(65) Prior Publication Data

US 2022/0095159 A1    Mar. 24, 2022

(51) Int. Cl.
*H04W 28/06* (2009.01)
*H04W 28/02* (2009.01)

(52) U.S. Cl.
CPC ....... *H04W 28/06* (2013.01); *H04W 28/0284* (2013.01)

(58) Field of Classification Search
CPC .......................... H04W 28/06; H04W 28/0284
See application file for complete search history.

(56) References Cited

U.S. PATENT DOCUMENTS

| | | | |
|---|---|---|---|
| 10,264,506 B2* | 4/2019 | Faccin | H04W 36/385 |
| 10,506,489 B2* | 12/2019 | Vrzic | H04W 36/26 |
| 10,638,405 B2* | 4/2020 | Myhre | H04W 16/00 |
| 2017/0041854 A1* | 2/2017 | Kim | H04W 28/02 |
| 2017/0142591 A1* | 5/2017 | Vrzic | H04L 47/2408 |
| 2018/0109992 A1* | 4/2018 | Lee | H04W 12/08 |
| 2018/0262924 A1* | 9/2018 | Dao | H04W 72/1257 |
| 2019/0124508 A1* | 4/2019 | Watfa | H04W 4/18 |
| 2019/0124544 A1* | 4/2019 | Shaw | H04L 5/0087 |
| 2019/0159108 A1* | 5/2019 | Lee | H04W 8/08 |
| 2019/0174392 A1* | 6/2019 | Chun | H04W 16/02 |
| 2019/0174536 A1* | 6/2019 | Han | H04W 74/002 |
| 2019/0174561 A1* | 6/2019 | Sivavakeesar | H04W 76/10 |
| 2019/0200208 A1* | 6/2019 | Chandramouli | H04W 76/18 |
| 2019/0223093 A1* | 7/2019 | Watfa | H04W 48/18 |
| 2019/0281494 A1* | 9/2019 | Chan | H04W 48/06 |
| 2019/0342821 A1* | 11/2019 | Kim | H04W 76/10 |
| 2019/0349774 A1* | 11/2019 | Lou | H04W 16/10 |
| 2019/0357119 A1* | 11/2019 | Hong | H04W 48/02 |
| 2020/0015131 A1* | 1/2020 | Ying | H04W 36/18 |
| 2020/0068430 A1* | 2/2020 | Chan | H04W 24/08 |

(Continued)

FOREIGN PATENT DOCUMENTS

WO    WO-2021183870 A1 *  9/2021

OTHER PUBLICATIONS

Technical Specification: 5G; NG-RAN; NG Application Protocol (NGAP) (3GPP TS 38.413 version 16.2.0 Release 16). 456 pages.

(Continued)

*Primary Examiner* — Parth Patel (57) ABSTRACT

A system may obtain information that indicates when a plurality of network slices are overloaded; generate a message that indicates which of the network slices are barred from access by wireless mobile terminals based on the information; and broadcast the message over a downlink wireless signal to a cell serviced by the system.

20 Claims, 11 Drawing Sheets

(56) References Cited

U.S. PATENT DOCUMENTS

| | | | |
|---|---|---|---|
| 2020/0068431 A1* | 2/2020 | Han | H04W 76/18 |
| 2020/0077327 A1* | 3/2020 | Duan | H04W 8/02 |
| 2020/0107378 A1* | 4/2020 | Velev | H04W 48/10 |
| 2020/0112868 A1* | 4/2020 | Shariat | H04W 48/06 |
| 2020/0120547 A1* | 4/2020 | Han | H04W 36/30 |
| 2020/0120580 A1* | 4/2020 | Jin | H04W 74/00 |
| 2020/0120738 A1* | 4/2020 | Kawasaki | H04W 76/18 |
| 2020/0137621 A1* | 4/2020 | Yang | H04W 28/0289 |
| 2020/0178158 A1* | 6/2020 | Won | H04W 76/27 |
| 2020/0196133 A1* | 6/2020 | Kawasaki | H04W 28/24 |
| 2020/0196382 A1* | 6/2020 | Kawasaki | H04L 29/08 |
| 2020/0336935 A1* | 10/2020 | Takakura | H04W 28/0289 |
| 2020/0336937 A1* | 10/2020 | Youn | H04W 8/08 |
| 2020/0351756 A1* | 11/2020 | Jager | H04L 47/127 |
| 2020/0366546 A1* | 11/2020 | Kommula | G06F 9/45558 |
| 2020/0366611 A1* | 11/2020 | Kommula | H04L 45/125 |
| 2020/0366612 A1* | 11/2020 | Kommula | H04L 41/5009 |
| 2020/0367090 A1* | 11/2020 | Zhang | H04W 76/32 |
| 2020/0389835 A1* | 12/2020 | Talebi Fard | H04W 12/76 |
| 2021/0029579 A1* | 1/2021 | Tiwari | H04W 48/06 |
| 2021/0099921 A1* | 4/2021 | Han | H04W 28/06 |
| 2021/0227450 A1* | 7/2021 | Chun | H04W 48/20 |
| 2021/0385742 A1* | 12/2021 | Liao | H04W 48/18 |
| 2021/0410059 A1* | 12/2021 | Talebi Fard | H04W 40/12 |
| 2022/0256342 A1* | 8/2022 | Watfa | H04W 8/02 |
| 2022/0264444 A1* | 8/2022 | Ryu | H04W 48/18 |
| 2023/0246724 A1* | 8/2023 | Pateromichelakis | H04W 72/0453 370/329 |

OTHER PUBLICATIONS

Technical Specification: 5G; NR; Radio Resource Control (RRC); Protocol specification (3GPP TS 38.331 version 15.7.0 Release 15). 523 pages.

Technical Specification: NR; Overall description; Stage-2 (3GPP TS 38.300 version 15.9.0 Release 15). 102 pages.

Technical Specification: 5G; Non-Access-Stratum (NAS) protocol for 5G System (5GS); Stage 3 (3GPP TS 24.501 version 15.3.0 Release 15). 486 pages.

Technical Specification: 5G; Service requirements for next generation new services and markets (3GPP TS 22.261 version 15.5.0 Release 15). 53 pages.

* cited by examiner

| IE NAME 402 | PRES 404 | RANGE 406 | IE TYPE 408 | ASSIGNED CRITICALITY 410 |
|---|---|---|---|---|
| MESSAGE TYPE | M | | | IGNORE |
| AMF OVERLOAD RESPONSE | O | | OVERLOAD RESPONSE | REJECT |
| AMF TRAFFIC LOAD REDUCTION INDICATION | O | | TRAFFIC LOAD REDUCTION INDICATION | IGNORE |
| OVERLOAD START NSSAI LIST | | | | IGNORE |
| OVERLOAD START NSSAI ITEM | | 1 ... MAX | | |
| SLICE OVERLOAD LIST | M | | | |
| SLICE OVERLOAD RESPONSE | O | | OVERLOAD RESPONSE | |
| SLICE TRAFFIC LOAD REDUCTION INDICATION | O | | TRAFFIC LOAD REDUCTION INDICATION | |

FIG. 5

```
SIB1 ::=      SEQUENCE {
  cellSelectionInfo           SEQUENCE {
    q-RxLevMin                  Q-RxLevMin,
    q-RxLevMinOffset            INTEGER (1..8)                                      OPTIONAL,     -- Need S
    q-RxLevMinSUL               Q-RxLevMin                                          OPTIONAL,     -- Need R
    q-QualMin                   Q-QualMin                                           OPTIONAL,     -- Need S
    q-QualMinOffset             INTEGER (1..8)                                      OPTIONAL,     -- Cond Standalone
  }
  cellAccessRelatedInfo         CellAccessRelatedInfo,
  connEstFailureControl         ConnEstFailureControl                               OPTIONAL,     -- Need R
  si-SchedulingInfo             SI-SchedulingInfo                                   OPTIONAL,     -- Need R
  servingCellConfigCommon       ServingCellConfigCommonSIB                          OPTIONAL,     -- Need R
  ims-EmergencySupport          ENUMERATED {true}                                   OPTIONAL,     -- Need R
  eCallOverIMS-Support          ENUMERATED {true}                                   OPTIONAL,     -- Cond Absent
  ue-TimersAndConstants         UE-TimersAndConstants                               OPTIONAL,     -- Need R
  uac-BarringInfo               SEQUENCE {
    uac-BarringPerSliceList       UAC-BarringPerSliceList                           OPTIONAL,     -- Need S
    uac-BarringForCommon          UAC-BarringPerCatList                             OPTIONAL,     -- Need S
    uac-BarringPerPLMN-List       UAC-BarringPerPLMN-List                           OPTIONAL,
    uac-BarringInfoSetList        UAC-BarringInfoSetList,
    uac-AccessCategory1-SelectionAssistanceInfo   CHOICE {
      plmnCommon                    UAC-AccessCategory1-SelectionAssistanceInfo,
      individualPLMNList            SEQUENCE (SIZE (2..maxPLMN)) OF UAC-AccessCategory1-SelectionAssistanceInfo,
    }                                                                               OPTIONAL,     -- Need S
  }                                                                                 OPTIONAL,     -- Need R useFullResumeID               ENUMERATED {true}                                   OPTIONAL,     -- Need R
  lateNonCriticalExtension      OCTET STRING                                        OPTIONAL,
  nonCriticalExtension          SEQUENCE{}                                          OPTIONAL
```

| RULE # 602 | REQUIREMENTS 604 | ACCESS CATEGORY 606 |
|---|---|---|
| 1 | MT access | 0 (MT_acc) |
| 2 | Emergency session | 2 (emergency) |
| 3 | Operator specified requirements | 32-63 (operator categories) |
| 4 | NAS signaling low priority or UE supporting S1 is configured for Extended Access Barring; UE received one of the categories as part of the parameters for unified access control in the in the broadcast system information and the UE is member of the broadcasted category in the PLMN | 1 (delay tolerant) |
| 5 | MMTel voice call; NAS signaling connection recovery during MMTel voice | 4 (MMTel voice) |
| 6 | MMTel video call; NAS signaling connection recovery during during MMTel video | 5 (MMTel video) |
| 7 | MO SMS over NAS; MO SMS over SMSoIP transfer; over NAS; NAS signaling connection recovery during MO SMS or MO SoIP transfer | 6 (MO SMS or MO SMSoIP) |
| 8 | MO signaling | 3 (MO_sig) |
| 9 | MO data | 7 (MO_data) |
| 10 | none | 7 (MO_data) |

FIG. 7

SYSTEMS AND METHODS FOR ACCESS BARRING BASED ON SLICE INFORMATION

BACKGROUND INFORMATION

Advanced wireless networks, such as Fifth Generation (5G) networks, have the ability to perform network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access networks, clouds, transport, Central Processing Unit (CPU) cycles, memory, etc. Furthermore, each network slice may be configured to meet a different set of requirements and be associated with a particular Quality of Service (QoS) class, type of service, and/or particular enterprise customers associated with mobile communication devices.

BRIEF DESCRIPTION OF THE DRAWINGS

FIG. 5 illustrates exemplary access barring information, which is included in an exemplary System Information Block 1, that is generated at a wireless station and/or a CU of FIGS. 1B, 1C, 3A and 3B for transmission to the cells serviced by the wireless station and/or the CU;

DETAILED DESCRIPTION OF PREFERRED EMBODIMENTS

The following detailed description refers to the accompanying drawings. The same reference numbers in different drawings may identify the same or similar elements.

When an advanced wireless network (e.g., a Fourth generation (4G) network, a Fifth Generation (5G) network, etc.) for mobile terminals (e.g., User Equipment (UE) devices) is under high network load conditions, the network may prevent further overload by applying what is termed Unified Access Control. The functionality allows the network to prevent or bar certain devices or types/classes of devices (e.g., smart phones) from accessing the wireless network when the devices attempt to transition from the disconnected state.

Depending on the configuration, the network may determine whether certain types of access attempts should be allowed or blocked (i.e., "barred") based on specific characteristics associated with the service. In more advanced networks, such as 5G New Radio (NR) networks, the access network (e.g., a radio access network) may broadcast control information to bar the mobile terminals from accessing the network, under particular criteria. That is, the network may permit the mobile terminals to place, for example, emergency calls, while disallowing network access for other lower-priority services.

Many of these networks also support the concept of "slicing" a physical network, or providing network "slices." For example, in 5G networks, the slicing concept extends end-to-end, including UE, RAN, transport network, core network etc. This allows for creation of many logical end-to-end networks with different characteristics over a common physical network. Because of slicing, most UE device-triggered network actions, such as "MO data" access (to be described below) are tied to a particular network slice. The network access can be to a slice that provides general Internet services, for example, or to a slice that provides enterprise services. However, these advanced networks have not yet integrated network slicing with their abilities to bar network access. Basic service constructs, such as "MO data" and "MO sig," are unable to be combined with the dimension of slicing. That is, the networks are not able to bar MO data and MO sig access limited to specific slices, although such access to a mission critical slices may be more important than MO data/sig access to a slice for providing generic Internet services.

The systems and methods described herein enable networks to distinguish mobile terminal access to the networks on a per-slice basis, and enable the networks and/or the mobile terminals to take appropriate actions based on slice-related information that is broadcast from the access networks.

Figure 1A:
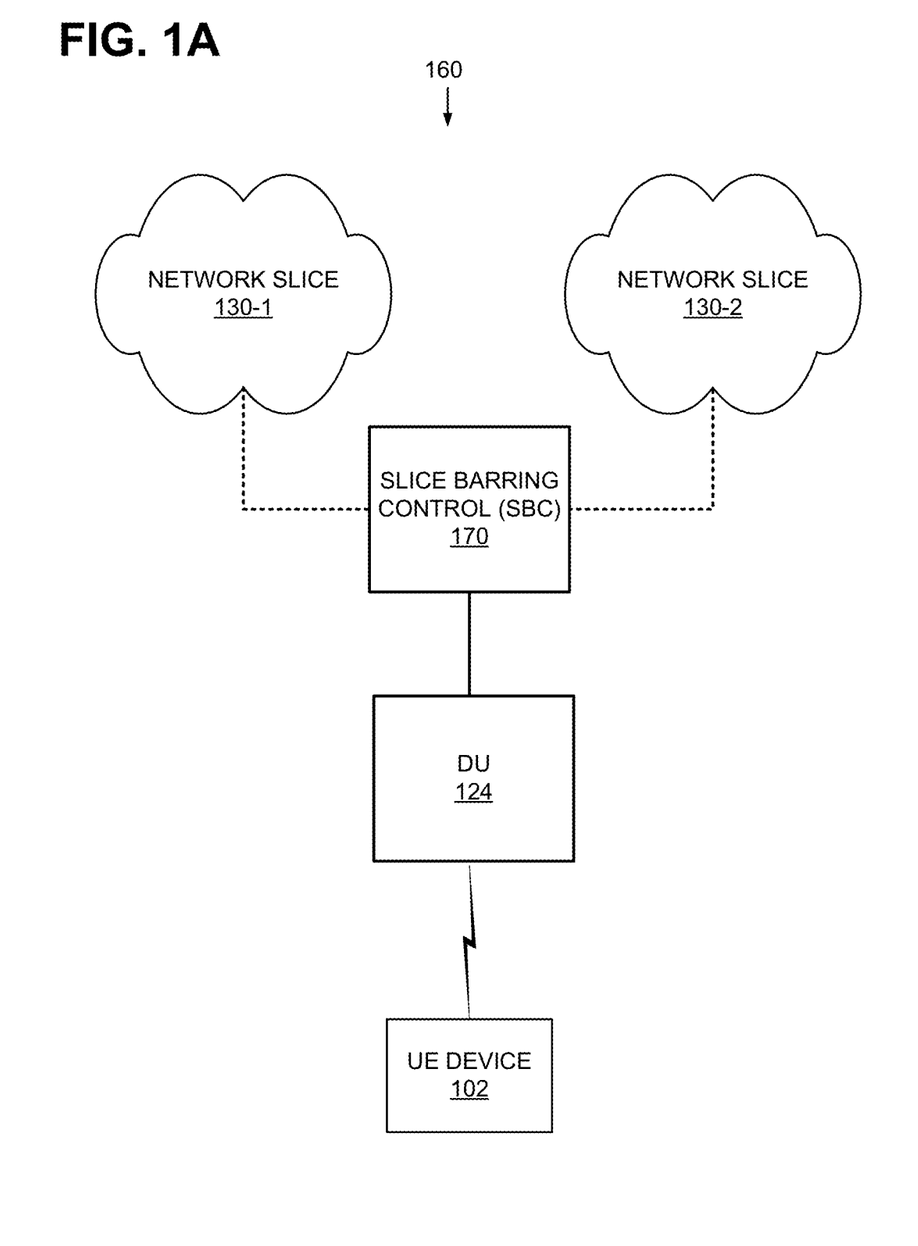
FIG. 1A illustrates concepts described herein.

FIG. 1A depicts the concepts described herein, within the context of an exemplary use-case scenario 160. As shown, scenario 160 involves a UE device 102, a Distributed Unit (DU) 124, network slices 130-1 and 130-2, and a Slice Barring Control (SBC) 170. In the scenario, the network slices 130 provide information related to its operating conditions, such as traffic overload conditions, error conditions, or other conditions that might affect its Quality-of-Service or throughput, to SBC 170. SBC 170 evaluates the conditions at the slices 130 and the RAN associated with the SBC 170. Upon evaluating the information, SBC 170 determines the criteria for any UE device 102 to access network slices 130-1 and 130-2. In the example shown, SBC 170 determines that a UE device 102 that wishes to access slice 130-1 may not do so when UE device 102 merely wants Internet services, but that such a device 102 may still access slice 130-2. After determining the access criteria, SBC 170 causes DU 124 to broadcast the slice barring information. When a UE device 102 that wants to access network slice 130-1 for general Internet services receives the broadcast from DU 124, UE device 102 attempts to access network slice 130-2 for the desired services. In this way, network slice 130-1 may be protected from further overload.

Although FIG. 1A shows aspects of the overall concepts, in actual implementations and use-cases, the number and the operations of slices 130, UE device 102, and SBC 170 may be different from those depicted. Furthermore, the functionalities of the slices 130, UE device 102, and SBC 170 may also be different from those described above.

Figure 1B:
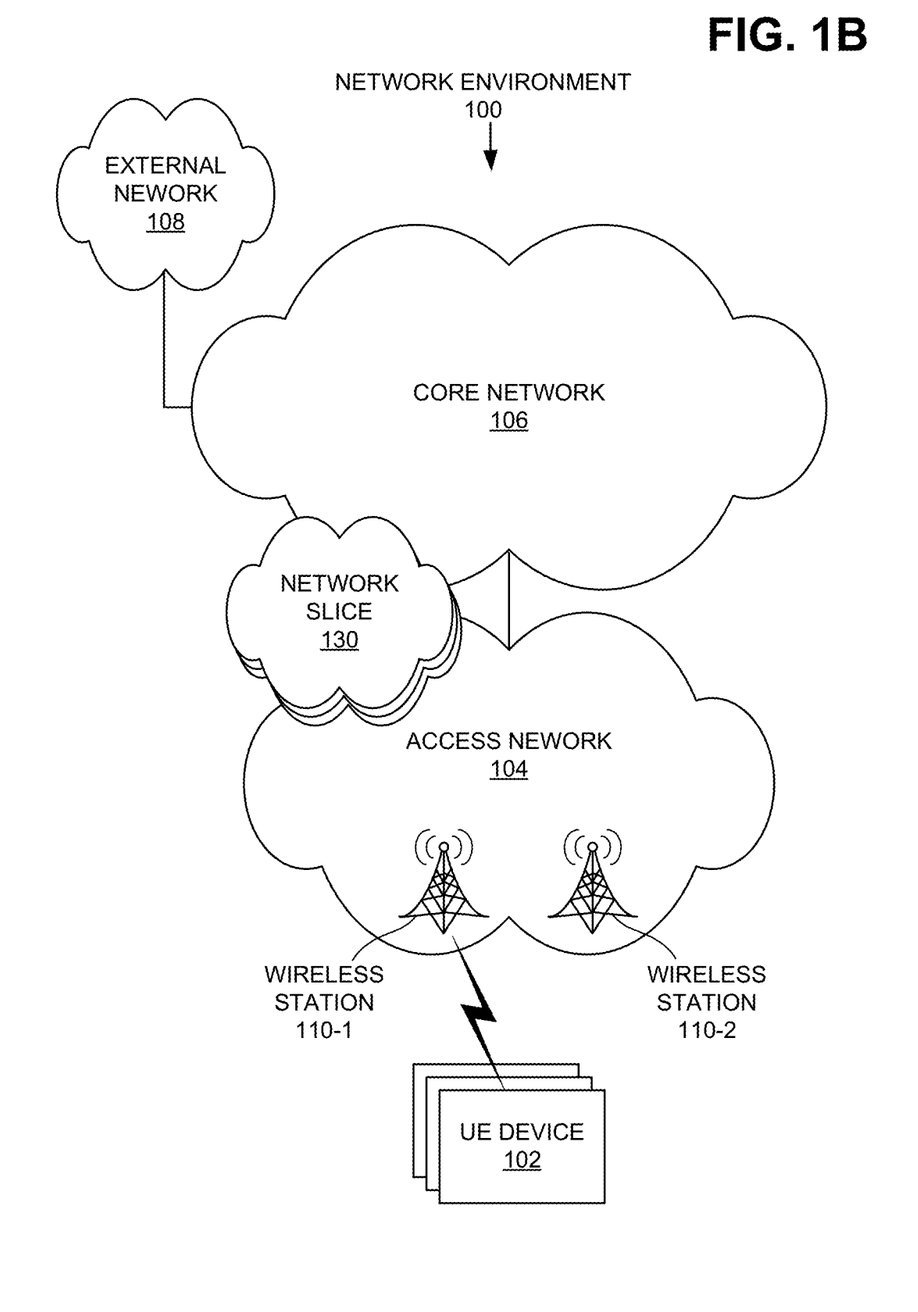
FIG. 1B depicts an exemplary network environment in which the concepts described herein may be implemented.
Figure 1C:
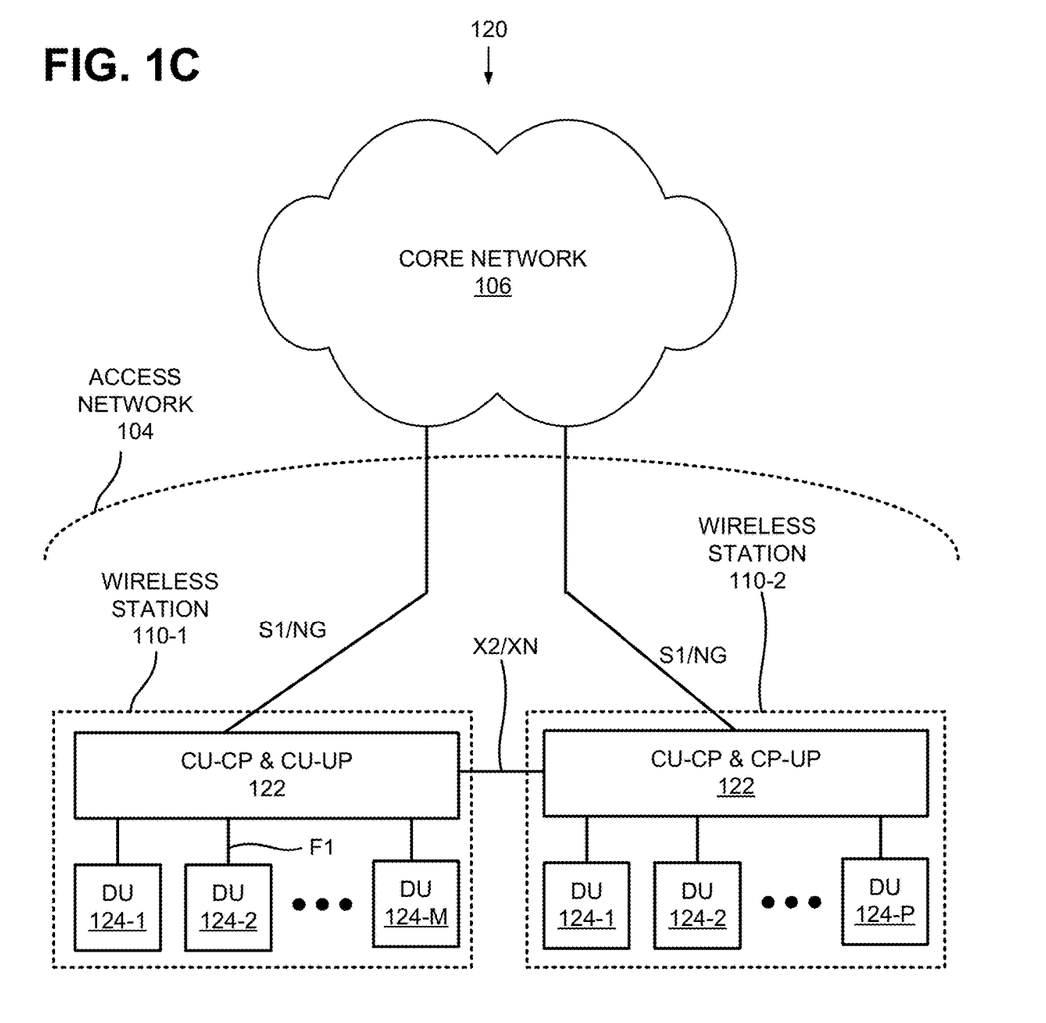
FIG. 1C shows exemplary functional components in the access network of FIG. 1B according to one implementation.
Figure 1D:
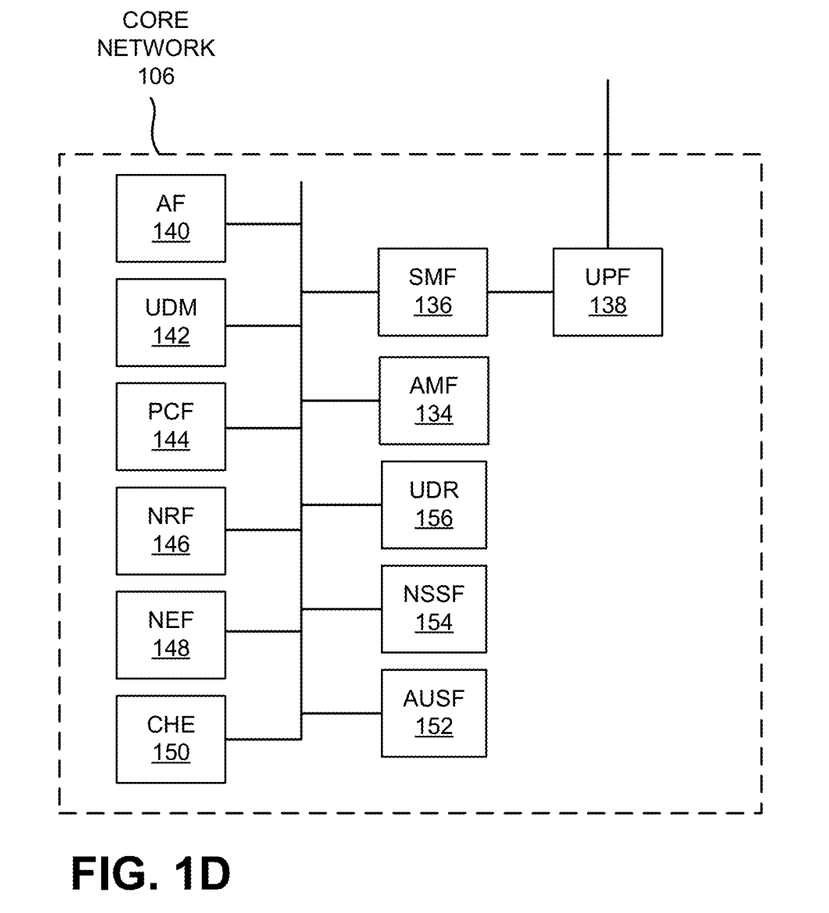
FIG. 1D illustrates exemplary functional components in the core network of FIG. 1B according to one implementation.

FIG. 1B depicts an exemplary network environment 100 in which the concepts described herein may be implemented. FIGS. 1C and 1D show functional components of portions of network environment 100 in greater detail. Referring to FIG. 1B, network environment 100 may include one or more of UE device 102, access network 104, core network 106, external network 108, and network slices 130.

UE device 102 may include a wireless communication device. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

Access network 104 may allow UE device 102 to access core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include a 4G radio network, a 5G radio network and/or another advanced radio network. These radio networks may include many wireless stations, which are illustrated in FIG. 1B as wireless stations 110-1 and 110-2 (generically referred to as wireless station 110 and collectively as wireless stations 110) for establishing and maintaining an over-the-air channel with UE device 102.

Wireless station 110 may include a 5G, 4G, or another type of wireless station (e.g., evolved Node B (eNB), next generation Node B (gNB), etc.) that includes one or more Radio Frequency (RF) transceivers. Wireless station 110 (also referred to as base station 110) may provide or support one or more of the following: 4 Tx functions (e.g., 4 transceiver antenna function); carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 110 may be part of an evolved UMTS Terrestrial Network (eUTRAN). Wireless station 110 may include Remote Electronic Tilt (RET) capability for beam steering or beam shaping.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, a Long Term Evolution (LTE) network (e.g., a 4G network), a 5G network, an ad hoc network, a telephone network (e.g., the Public Switched Telephone Network (PSTN), an intranet, or a combination of networks. Core network 106 may allow the delivery of communication services (e.g., Internet Protocol (IP) services) to UE device 102, and may interface with other networks, such as external network 108. Depending on the implementation, core network 106 may include 4G core network components (e.g., a Serving Gateway (SGW), a Packet data network Gateway (PGW), a Mobility Management Entity (MME), etc.), 5G core network components, or another type of core network component.

External network 108 may include networks that are external to core network 106. In some implementations, external network 108 may include packet data networks, such as an IP network. An IP network may include, for example, an IP Multimedia Subsystem (IMS) network.

Network slice 130 may include logical network components implemented on top of a shared physical network infrastructure using SDN and/or NFV. Each network slice 130 may include one or more of virtualized core network components and virtualized RAN components. As discussed above, each network slice 130 may feed information indicating its operating condition to SBC 170, as described below with reference to FIGS. 3A and 3B.

FIG. 1C illustrates exemplary functional components of access network 104 of FIG. 1B. One or more of the components illustrated in FIG. 1C may be implemented as a virtual network function, as part of a network slice 130. In addition, one or more of the components illustrated in FIG. 1C may be part of SBC 170. As shown, each wireless station 110 includes a central unit-control plane (CU-CP) and central unit user plane (CU-UP) 122, distributed units (DUs) 124-1 through 124-M (or 124-1 through 124-P), and one or more Radio Units (RUs). For simplicity, RUs are not shown in FIG. 1C.

CU-CP and CU-UP 122 (collectively referred to as CU 122) may process control plane and user plane upper layers of the communication protocol stack for wireless stations 110. For example, assume that wireless station 110-1 is a gNB. Communications at gNB user plane may include, from the lowest layer to the highest layer: a physical (PHY) layer, a Media Access Control layer (MAC) layer, a Radio Link Control (RLC) layer, and a Packet Data Convergence Protocol (PDCP) layer. The control plane communications include the same layers as those in the user plane, and in addition, includes a Radio Resource Control (RRC) layer and/or other layers. CU 122 may not be located physically close to DUs 124, and may be implemented as cloud computing elements, through network function virtualization (NFV) capabilities of the cloud. As shown, CU 122 communicates with the components of core network 106 through S1/NG interface and with other CUs 122 through X2/XN interface. A CU 122 may be part of a network slice 130 and/or SBC 170.

DUs 124 may process lower layers of the communication protocol stack and may provide support for one or more cells with multiple radio beams. In addition, DUs 124 may handle UE device mobility, from DU to DU, gNB to gNB, cell to cell, beam to beam, etc. DUs 124 may communicate with a CU 122 through F1 interface.

FIG. 1D illustrates exemplary functional components of core network 106 of FIG. 1B, when core network 106 is implemented as a 5G core network. The components illustrated in FIG. 1D may be implemented as virtual network functions that are part of network slice 130. As shown, 5G core network may include: an Access and Mobility Function (AMF) 134 to perform registration management, connection management, reachability management, mobility management, and/or lawful intercepts; an Session Management Function (SMF) 136 to perform session management, session modification, session release, IP address allocation and management, Dynamic Host Configuration Protocol (DHCP) functions, and selection and control of a User Plane Function (UPF) 138; and a UPF 138 to serve as a gateway to packet data network, act as an anchor point, perform packet inspection, routing, and forwarding, perform QoS handling in the user plane, uplink traffic verification, transport level packet marking, downlink packet buffering, and/or other type of user plane functions.

Core network 106 further includes: an Application Function (AF) 140 to provide services associated with a particular application; a Unified Data Management (UDM) 142 to manage subscription information, handle user identification and authentication, and perform access authorization; a Policy Control Function (PCF) 144 to support policies to control network behavior, provide policy rules to control plane functions, access subscription information relevant to policy decisions, and perform policy decisions; a Network Repository Function (NRF) 146 to support service discovery, registration of network function instances, and maintain profiles of available network function instances; a Network Exposure Function (NEF) 148 to expose capabilities and events to other network functions, including third party network functions; a Charging Function (CHF) 150 to perform charging and billing functions; an Authentication Server Function (AUSF) 152 to render authentication services and other security related services to other network components; a Network Slice Selection Function (NSSF) 154 to select a network slice instance to serve a particular UE device 102; a Unified Data Repository (UDR) 156 to provide a repository for subscriber information and other types of information; and/or other types of network functions. It should be noted that AMF 134 may be included in SBC 170.

For simplicity, FIGS. 1A-1D do not show all components that may be included in network environment 100 (e.g., routers, bridges, wireless access point, additional networks, additional UE devices, etc.), access network 104, core network 106, and external network 108. That is, depending on the implementation, network environment 100, access network 104, core network 106, and external network 108 may include additional, fewer, different, or a different arrangement of components than those illustrated in FIGS. 1A-1D.

Figure 2:
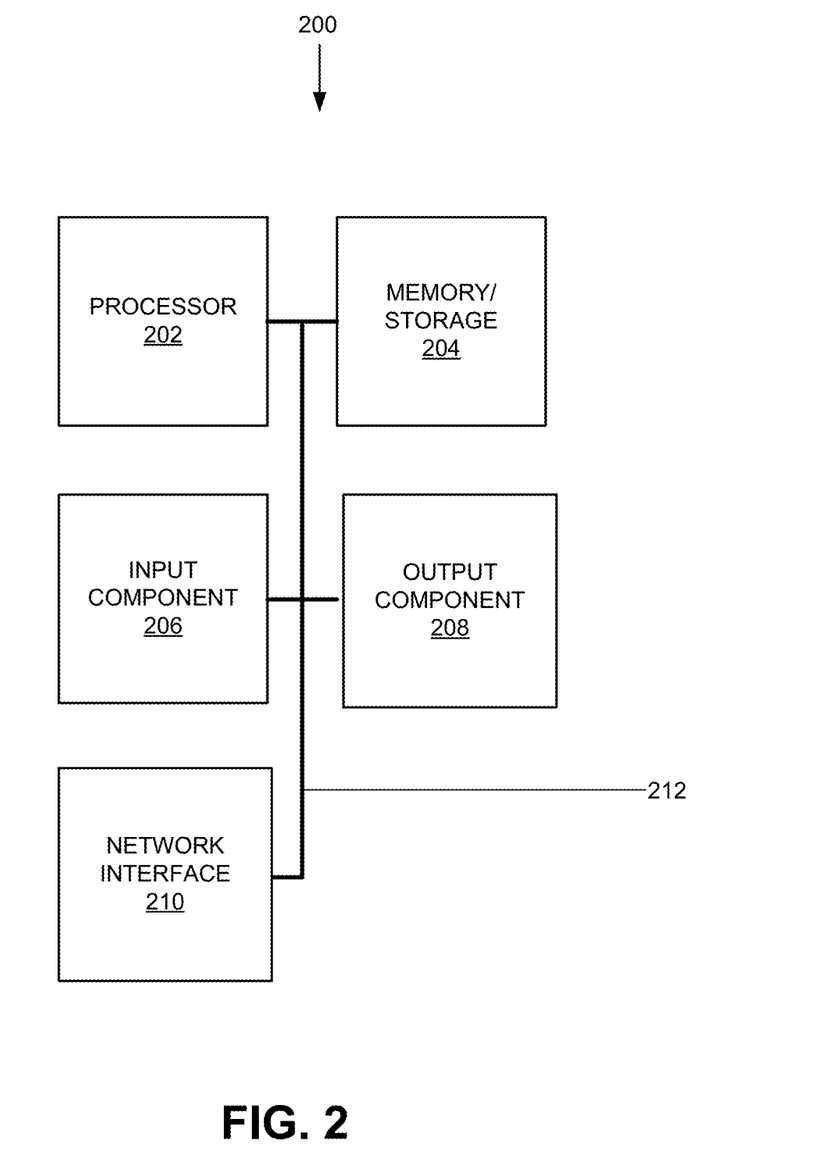
FIG. 2 depicts exemplary components of an exemplary network device of the networks of FIGS. 1A-1D.

FIG. 2 depicts exemplary components of an exemplary network device 200. One or more of network device 200 correspond to, are included in, or provide a hardware platform for implementation of any of the network components of FIGS. 1A-1D (e.g., a router, a network switch, servers, gateways, wireless stations 110, UE device 102, an infrastructure for implementing network slices 130, etc.). As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 110.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein.

Figure 3A:
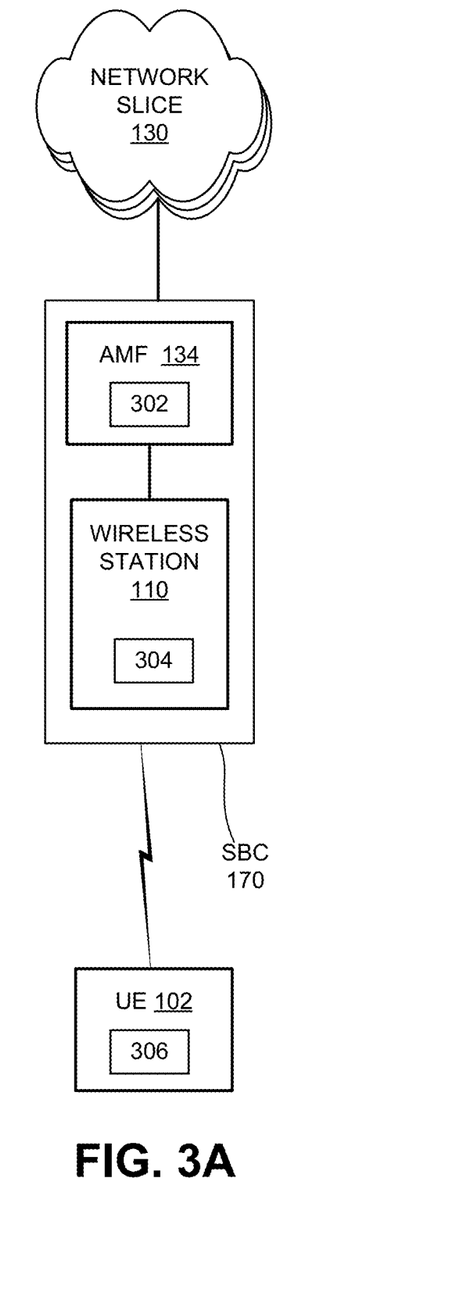
FIGS. 3A and 3B illustrate exemplary logical components of the Slice Barring Control of FIG. 1A according to different implementations.
Figure 3B:
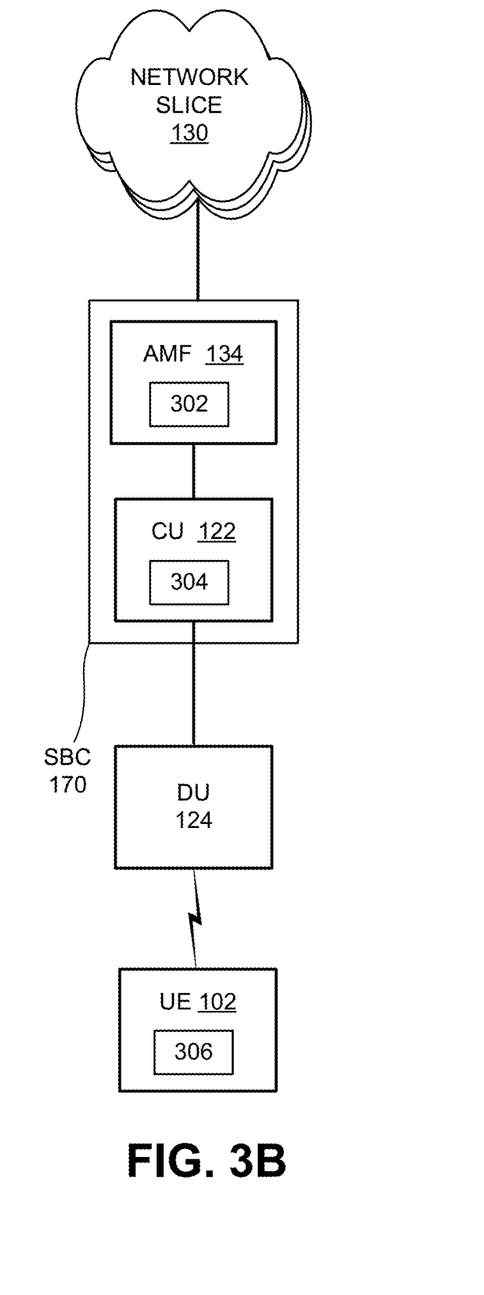

FIGS. 3A and 3B illustrate exemplary functional components of the Slice Barring Control of FIG. 1A according to different implementations. Depending on the implementation, SBC 170 may include components other than those depicted in FIGS. 3A and 3B. In FIG. 3A, SBC 170 includes a version of AMF 134, a wireless station 110, and/or UE device 102. AMF 134, wireless station 110, and UE device 102 may include SBC logic 302, 304, and 306, respectively.

AMF 134, in addition to performing functions described above, may receive slice-related performance information from network slices 130. The information may include data that indicates operational conditions of network slices 130, such as an overload condition (i.e., its maximum traffic handling capacity and its current traffic, its throughput, average latency/delay, jitter, etc.).

Logic 302 in AMF 134 may process the information, and cause AMF 134 to issue messages to wireless station 110. Each message may include what are herein referred to as "information elements" (IEs). The information elements may include slice-related IEs, as explained below with reference to FIG. 4. AMF 134 may also issue messages with IEs that are not related to slices, although they sill pertain to access barring, as also explained below.

Wireless station 110, in addition to performing functions described above, may receive slice-related IEs from AMF 134. Logic 304, within wireless station 110, obtains UE device-originated traffic-related information for each network slice 130 coupled thereto (e.g., slice traffic, throughput, latency, etc.) based on CU-CP and CU-UP resources consumed for each slice due to the traffic, and together with the received IEs from AMF 134, determines and generates appropriate access barring information that wireless station 134 is to broadcast to UE devices in the cell. Wireless station 110 then incorporates the access barring information as part of a System Information Block 1 (SIB 1). Wireless station 110 broadcasts the SIB and a Master Information Block (MIB), as Minimum System Information (MSI) to UE devices 102 in the cell.

When UE device 102 receives the broadcast, logic 306 in UE device 102 detects the slice barring information sent from wireless station 110, determines what UE device 102 would like to do in response to the slice barring information. For example, if the information indicates that UE device 102 is barred from a network slice 130-2 that UE device 130 wishes to access, logic 306 may direct UE device 102 to attempt to request access to a different slice 130-2, which is not access-barred for the particular service that the UE device 102 wishes to obtain from the network.

In FIG. 3B, SBC 170 includes AMF 134, a CU 122, and/or UE device 102. AMF 134, CU 122, and UE device 102 may include, respectively, SBC logic 302, 304, and 306. In contrast to FIG. 3A, logic 304 is part of CU 122 rather than part of wireless station 110.

In FIG. 3B, AMF 134 and logic 302 perform similar functions as those described above for FIG. 3A. However, in contrast to AMF 134 and logic 302 in FIG. 3A, in FIG. 3B, AMF 134 and logic 302 direct its slice-related IE to CU 122 over the NG interface, rather than to wireless station 110.

CU 122, in addition to performing the functions described above, may receive slice-related IEs from AMF 134 over the NG interface. Logic 304, within CU 122, obtains UE device 102-originated traffic information for each network slice 130 coupled thereto (e.g., slice traffic, throughput, latency, etc.) and CU-CP and CU-UP resource consumed per slice for the traffic, and together with the received IEs from AMF 134, determines and generates appropriate access barring information that CU 122 should forward to DU 124 for broadcasting to UE 102 in the cell. CU 122 then incorporates the information as part of a System Information Block 1 (SIB 1) and relays the information to DU 124. DU 124 broadcasts the SIB and a Master Information Block (MIB), as MSI to the cell. When UE device 102 receives the broadcast, UE device 102 and logic 306 may respond similarly as the UE device 102 and logic 306 in FIG. 3A.

Although in FIGS. 3A and 3B, logic 304 is illustrated as being part of wireless station 110 and/or CU 122, in other implementations, logic 304 may be implemented as a stand-alone software/hardware component that is external to wireless station 110 and/or CU 122. In addition, in some implementations, UE device 102 may or may not include logic 306. That is, SBC 170 may include additional, fewer, different, or a different arrangement of logical components 302, 304, and 306 than those illustrated in FIGS. 3A and 3B.

Figure 4:
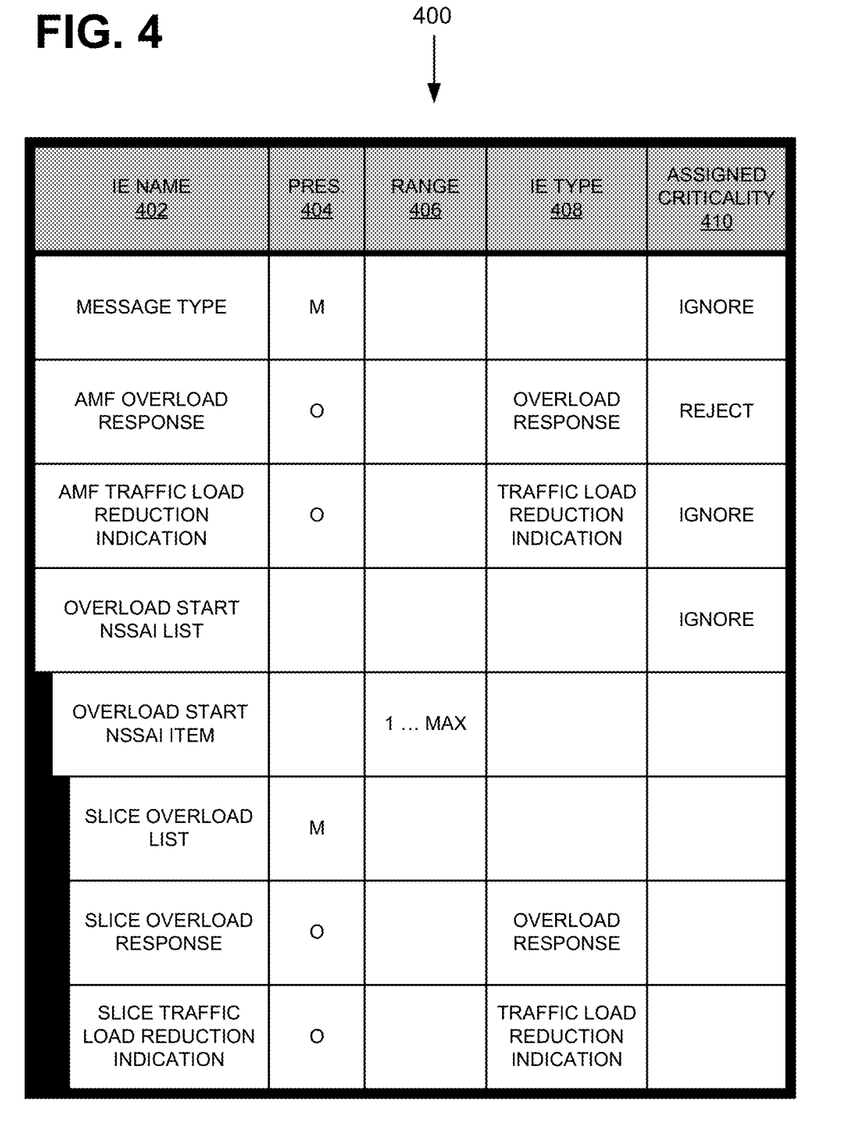
FIG. 4 illustrates a table of exemplary information elements that the Access and Mobility Function (AMF) of FIGS. 3A and 3B may include in messages that the AMF sends to a wireless station or to a Central Unit (CU)

In the above, it has been mentioned that AMF 134 may send messages that include information elements (IEs) to wireless station 110 or CU 122. FIG. 4 illustrates a table 400 of exemplary information elements that AMF 134 of FIGS. 3A and 3B may include in the messages that the AMF 134 sends to wireless station 110 and/or CU 122. Table 400 indicates, for each information element listed, a number of characteristics of the IE. In particular, for each information element, table 400 shows its name 402, presence information 404, range 406, IE type 408, and assigned criticality 410. IE name 402 indicates the name associated with the IE; Presence 404 indicates whether the information element must be included (M for mandatory or O for optional); Range 406 indicates a number of the information element that may be included in the message. IE type 406 indicates the type of information element—the information element may be one of many defined IE types. Assigned criticality 410 indicates how a recipient of the IE may respond to the information element when it is unable to appropriately interpret or parse the IE.

As shown, table 400 lists the following IEs: Message Type IE, AMF Overload Response IE, AMF Traffic Overload Reduction Indication IE, Overload Start NSSAI List IE, Overload Start NSSAI Item IE, Slice Overload List IE, Slice Overload Response IE, and Slice Traffic Reduction Indication IE. Depending on the implementation, AMF 134 may send messages that include additional, fewer, and/or different information elements than those shown in table 400.

Message Type IE indicates the type of message. AMF Overload Response IE indicates the required response by the RAN node (e.g., wireless station 110 or CU 122) to the overload condition.

AMF Traffic Overload Reduction Indication IE specifies the percentage of the type of traffic relative to the instantaneous incoming rate at the RAN node, as indicated at another IE, to be dropped or rejected. Overload Start NSSAI List IE indicates that the slices identified by the list of Network Slice Selection Assistance Information (NSSAI)) are overloaded.

Overload Start NSSAI Item IE may indicate the identity of a slice that is overloaded. This particular IE may occur for each overloaded slice. Slice Overload list IE may provide the NSSAI which identifies the overloaded slice. Slice Overload Response IE indicates the required response by the RAN node for the overloaded slice. Slice Traffic Load Reduction Indication IE specifies the percentage of the type of traffic relative to the instantaneous incoming rate at the RAN node that is to be rejected or dropped.

Table 400 shows, through the Assigned Criticality 410 column, that the recipient node (e.g., wireless station 110 or CU 122) may respond to different IEs in different ways when the IE is not understood/parsed by the recipient node. For Message Type IE, AMF Traffic Load Reduction Indication IE, and Overload Start NSSAI List IE, the recipient node may ignore the IE. In contrast, when AMF Overload Response IE is received, the recipient node may explicitly reject the IE. Also, table 400 shows that Message Type IE and Slice Overload List IE (assuming Overload Start NSSAI Item is present) are mandatory in the message, while AMF Overload Response IE, AMF Traffic Load Reduction Indication IE, Slice Overload Response IE, and Slice Traffic Load Reduction Indication are optional.

As discussed above, when wireless station 110 or CU 122 receives, from AMF 134, messages that include slice-related IEs, after evaluating the AMF 134 overload conditions based on the IEs and traffic data/information which the wireless station 110/CU 122 obtains locally, the wireless station 110 and CU 122 may determine and generate appropriate access barring information to be broadcast to the cell, as part of SIB 1. FIG. 5 illustrates exemplary access barring information, which is included in an exemplary SIB 1 500, that is generated at wireless station 110 and/or CU 122 for transmission to the cell serviced by the wireless station 110 and/or CU 122. As depicted, SIB 1 500 includes access barring information 502, of which slice barring information 504 is part. Although SIB 1 500 includes other information, for simplicity, they are not discussed below.

Access barring information 502 (which is named "uac-barringInfo" in FIG. 5) may include, in addition to slice barring information 504, information on barring that pertains to particular categories of UE access. After UE device 102 receives the broadcast and decodes SIB 1 500, to use the barring information that pertains to access categories, UE device may identify the category for its access to the network. Possible categories to which the UE device 102's access may belong are described below with reference to FIG. 6.

Slice barring information 504 may include information on slices that are allowed or barred. Slice barring information 504 may indicate, on per slice basis or for multiple slices, the services that are allowed/barred. In addition, information 504 may indicate, whether a single slice or a group of multiple slices are allowed/barred.

Figure 6:
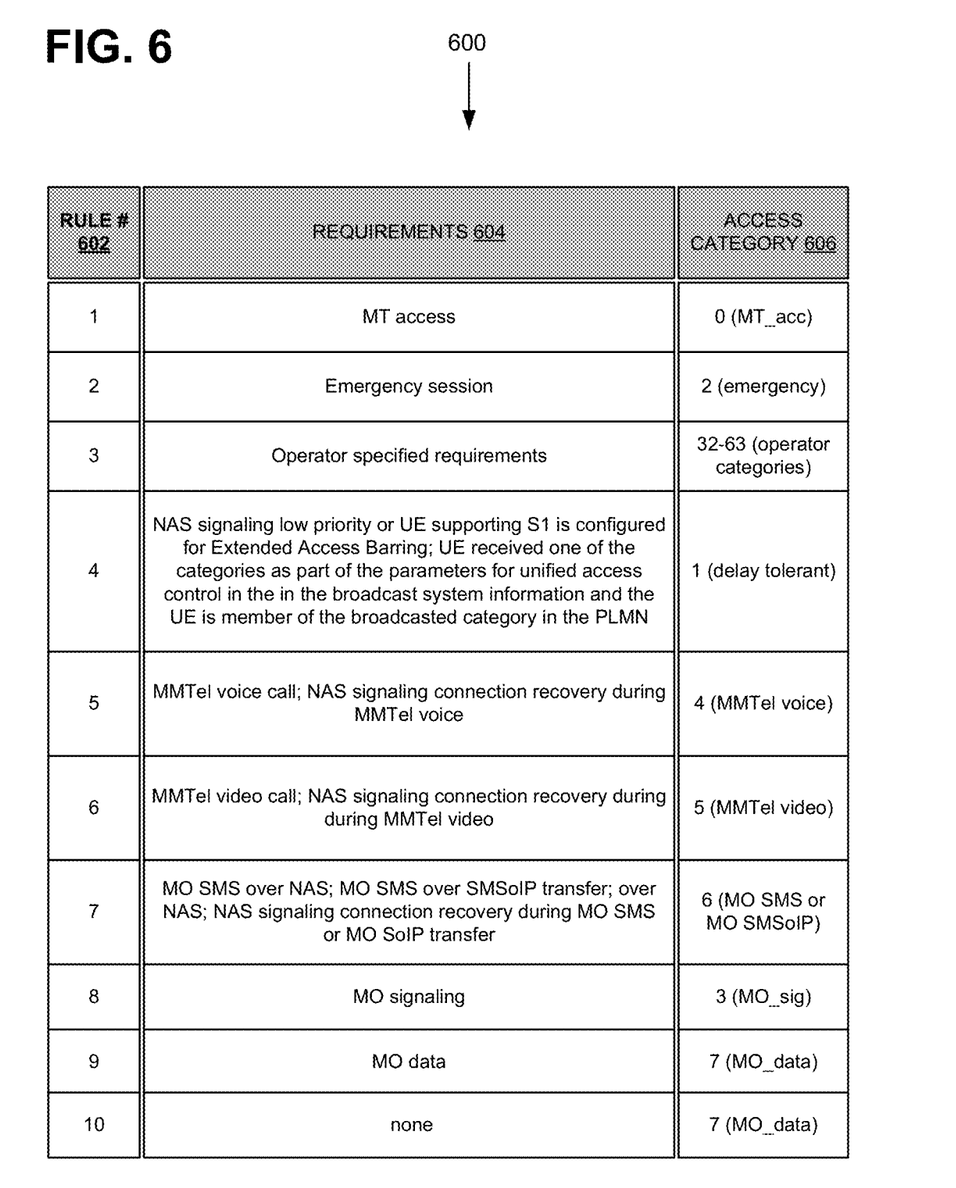
FIG. 6 illustrates a table of exemplary access categories.

FIG. 6 illustrates a table 600 of exemplary access categories. Table 600 lists different categories, one of which a particular access may belong to. Table 600 includes, for each of the categories, a rule #602, requirements 604, and access category 606. Rule #602 indicates an index for referring to a particular set of criteria for determining whether an access belongs to the specified category. Requirements 604 describes the criteria, and access category 606 refers to a numerical value that denotes the category.

As shown, Rule #1 indicates that an access may belong to access category 0, if the access is to reach a mobile terminal. Rule #2 indicates that an access may belong to access category 2, if the access is for an emergency (e.g., emergency call). Rule #3 indicates that if an access is an operator specified access type, it may belong to one of categories 32-63.

Rule #4 specifies that an access may belong to access category 1 if the access is a delay tolerant access. A delay tolerant access may occur, for example, when there is non-access stratum (NAS) signaling of low priority, or when UE device 102 that supports S1 interface is configured for extended access barring. A delay tolerant access may also occur if UE device 102 received information on categories as part of SIB 1 and when the UE device 102 is a member of broadcast category in the Public Land Mobile Network (PLMN).

Rule #5 specifies that the access category is Multimedia telephony service (MINITEL) for voice (access category=4), if the access is for a MMTEL voice call; or is NAS signaling connection recovery during MMTEL for voice.

Rule #6 is similar to rule #5, except that it pertains to MMTEL for video (access category=5).

Rule #7 specifies that the access belongs to access category 6, if the access is for mobile originated (MO) Short Messaging Service (SMS); for MO SMS over SMS over IP (SMSoIP) transfer or for NAS signaling connection recovery during an ongoing MO SMS session or SMSoIP transfer.

Rule #8 specifies that the access belongs to access category 3 if the access is for MO signaling. Rule #9 specifies that the access belongs to access category 7 if the access is for MO data. Rule #10 indicates that if the access is for sending user data packet for a Packet Data Unit (PDU) session with suspended user plane resources, the access belongs to category 7.

Figure 7:
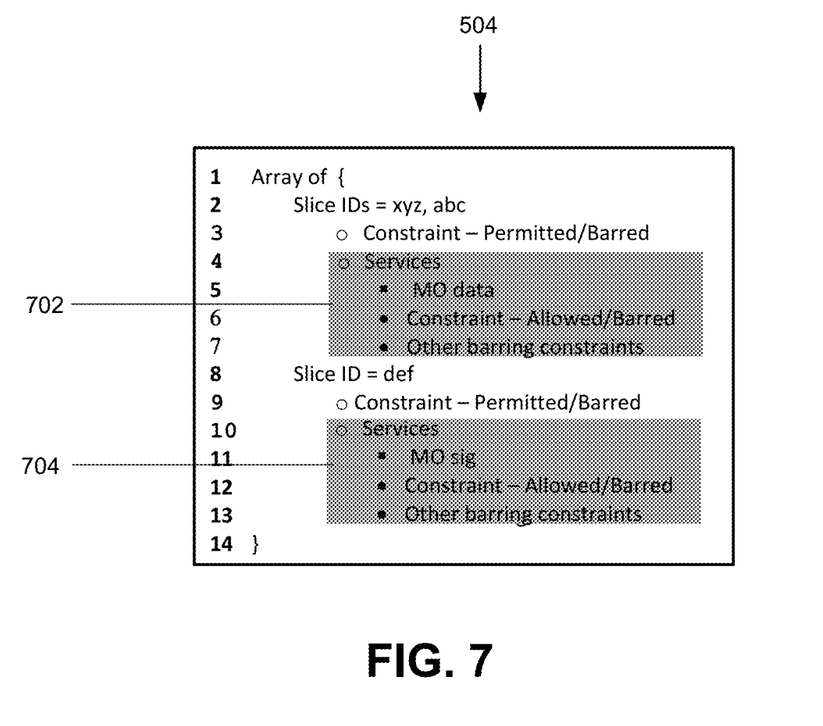
FIG. 7 illustrates exemplary format of the contents of the Slice Barring Information of FIG. 5 according to one implementation.

FIG. 7 illustrates exemplary format of the contents of slice barring information 504 of FIG. 5 according to one implementation. As shown, slice barring information 504 includes an array of slice group information (lines 2-7) and slice information (lines 8-14). The slice group information specifies: slice identifiers (e.g., Network Slice Selection Assistance Information (NSSAI)) (line 2) and a service block 702 (lines 4-7). The service block 702 specifies the service (e.g., MO data), an indication of whether the service is barred or not, and/or other barring information.

The slice information specifies: a slice identifier (e.g., NSSAI) (line 8) and a service block 704 (lines 10-13). The service block 704 specifies the service (e.g., MO sig), an indication of whether the service is barred or not, and other barring information.

Figure 8:
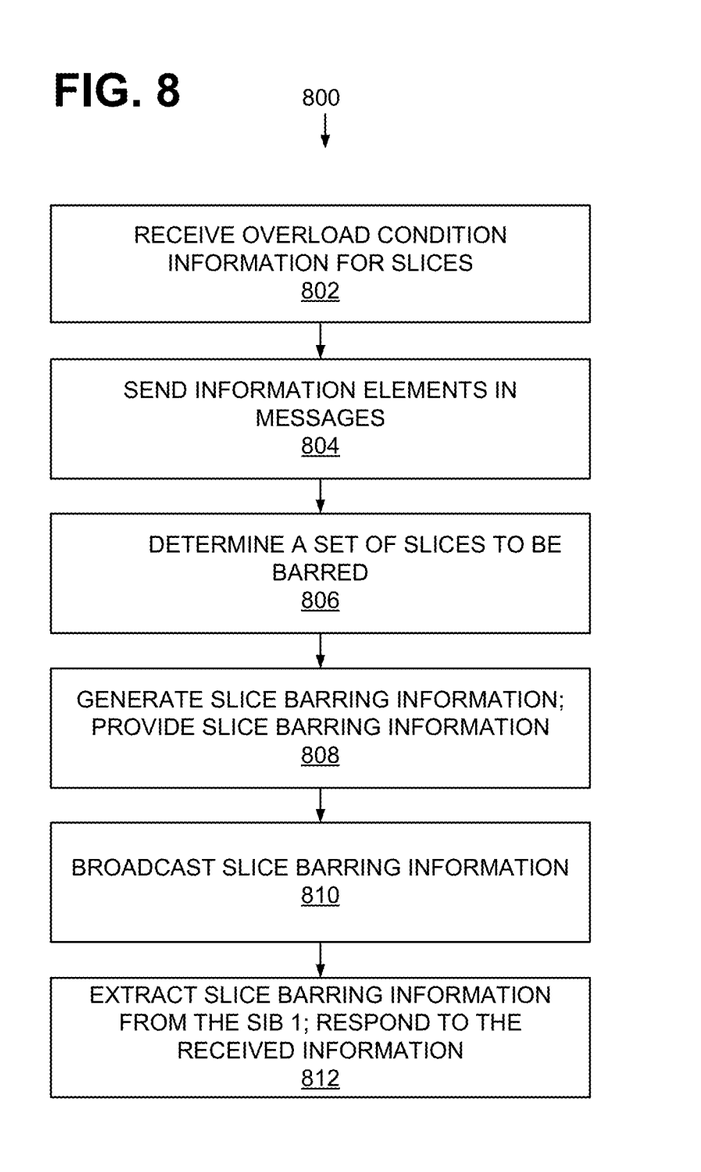
FIG. 8 illustrates an exemplary process for access barring based on slice information.

FIG. 8 illustrates an exemplary process 800 for access barring based on slice information. Process 800 may be performed by one or more of the components illustrated in IFG. 3A and/or 3B (e.g., logic 302-306, wireless station 110, CU 122, AMF 134). As shown, process 800 may include AMF 134 receiving overload condition information from network slices 130. For example, AMF 134 may receive, from each of the slices 130, their traffic conditions, their throughput, and/or other data indicating whether each slice is congested, the degree of congestion at each slice 130, etc.

Process 800 may also include AMF 134 sending messages that include information elements that indicate overload condition at each of the slices 130 (block 804). When AMF 134 receives the overload information from slices 130 and other network elements, AMF 134 may generate, using the received information, various information elements. The information elements may include, for example, a message type IE, AMF overload response IE, AMF Traffic Load Reduction Indication IE, Overload Start NSSAI List IE, Overload Start NSSAI Item IE, Slice Overload List IE, Slice Overload Response IE, and/or Slice Traffic Load Reduction Indication IE, or another types of IEs. AMF 134 may include the IEs in one or more messages and send the messages to wireless station 110 or CU 122.

Process 800 may further include wireless station 110 and/or CU 122 determining a set of network slices to be barred (block 806). For example, wireless station 110 and/or CU 122, may determine the overload conditions and the contributions to the overload at each slice 130 based on, for example, local resource consumption in access network 104 (or the RAN) (e.g., based on consumption of CU 122 and/or Radio Resource Control (RRC) resources).

Examples of local resources whose consumption reflects the congestion at access network 104 include RRC connections (per cell) at DU 124 and physical resources at CU 122 (e.g., memory). At the DU level, congestion is reflected by the number of RRC connections at the cell, since a DU 124 may support only a limited number of RRC connections, depending on physical resources available at the DU 124. At the CU level, congestion is reflected by its use of physical resources, since the CU 122 has to use up a portion of its physical resources to store a DU context for each UE device 102 attached to DUs 124 that are connected to the CU 122.

Returning to FIG. 7, using slice-specific overload contribution information and the IEs from AMF 134, wireless station 110 and CU 122 may identify the network slices to be barred. When selecting slices to be barred, wireless station 110 and/or CU 122 may prioritize different slices based on Slice Differentiator values provided in NSSAIs within the IEs from AMF 134.

Process 800 may further include wireless station 110 and/or CU 122 generating slice barring information based on, for example, the slice priorities and/or a list of network slices to be barred or access controlled (block 808). CU 122 and logic 304 may provide the slice barring information to a component within wireless station HO, such as DU 124 (block 810). When DU 124 receives the slice barring information or when wireless station 110 generates the slice barring information, DU 124 and/or the wireless station 110 may broadcast the information as part of SIB 1 (within an MSI) to the cells serviced by the wireless station 110 and/or DU 124 (block 812).

Process 800 may further include UE device 102 receiving the broadcast information, decoding the SIB 1 500 therein, and extracting the slice barring information in SIB 1 500. Upon determining which slices are barred for particular services, UE device 102 (or logic 306 within UE device 102) may determine an appropriate response. For example, UE device 102 may attempt to access a slice different from the one it was intending to access prior to the receipt of the slice barring information; wait a predetermine length of time; access a different network (if available); etc. In this way, AMF 134, wireless station 110, and/or CU 122 may protect access network 104 and/or core network 106 from further overload.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of processes have been described above with regard to blocks illustrated in FIG. 8, the order of the processing may be modified in other implementations. In addition, non-dependent processing may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
   a device configured to:
      obtain information that indicates when a plurality of network slices are overloaded;
      generate, based on the information, a message that includes:
         a slice information array comprising at least one block, which includes:
            a Single-Network Slice Selection Assistance Information (S-NSSAI) identifying a network slice,
            a barring status which, when set to a first value, indicates that the network slice is barred from access and when set to a second value, indicates that the network slice is allowed access by wireless mobile terminals, and
            information identifying a service provided by the network slice corresponding to the S-NSSAI; and
      send the message to a distributed unit (DU) to broadcast the message over a wireless signal to a cell.

2. The system of claim 1, wherein when the device obtains the information, the DU is further configured to:
   obtain some of the information from information elements that are sent by an Access and Mobility Function (AMF) in a core network.

3. The system of claim 2, wherein the information elements include:
   a NSSAI.

4. The system of claim 3, wherein the device is further configured to:
   extract a slice differentiator from the NSSAI for each of the network slices, and
   prioritize the network slices for barring based on the extracted slice differentiators.

5. The system of claim 1, wherein the DU is configured to:
   broadcast the message as part of a System Information Block (SIB) over the wireless signal to the cell.

6. The system of claim 1, wherein the device includes:
   a central unit (CU); or
   a device that is external to a next generation node B (gNB).

7. The system of claim 1, wherein when the device obtains the information, the device is further configured to:

determine a first amount of resources consumed at a Central Unit-Control Plane (CU-CP) and a Central Unit-User Plane (CU-UP) for each of the network slices;
determine a second amount of Radio Resource Control (RRC) resources for each of the network slices; and
determine which of the network slices are to be barred based on the information, wherein the information indicates the first amount of resources and the second amount of resources.

8. The system of claim 1, wherein the message includes:
information that indicates, for each of the network slices, what category of access is barred.

9. The system of claim 8, wherein the access category includes:
a mobile-originated (MO) data;
a multimedia telephony (MMTEL) for voice;
an MMTEL for video; or
an MO Simple Messaging Service (MO SMS).

10. The system of claim 1 further comprising:
an Access and Mobility Function (AMF), wherein the AMF is configured to:
determine which of the network slices are overloaded;
generate information elements that identify the overloaded network slices; and
provide the information elements to the device.

11. A method comprising:
obtaining information that indicates when a plurality of network slices are overloaded;
generating, based on the information, a message that includes:
a slice information array comprising at least one block, which includes:
a Single-Network Slice Selection Assistance Information (S-NSSAI) identifying a network slice,
a barring status which, when set to a first value, indicates that the network slice is barred from access and when set to a second value, indicates that the network slice is allowed access by wireless mobile terminals, and
information identifying a service provided by the network slice corresponding to the S-NSSAI; and
sending the message to a distributed unit (DU) for broadcasting the message over a wireless signal to a cell.

12. The method of claim 11, wherein obtaining the information includes:
obtaining some of the information from information elements that are sent by an Access and Mobility Function (AMF) in a core network.

13. The method of claim 12, wherein the information elements include:
a NSSAI.

14. The method of claim 13, further comprising:
extracting a slice differentiator from the NSSAI for each of the network slices, and
prioritizing the network slices for barring based on the extracted slice differentiators.

15. The method of claim 11, wherein sending the message for broadcasting the message includes:
sending the message for broadcasting the message as part of a System Information Block (SIB) over the wireless signal to the cell.

16. The method of claim 11, wherein obtaining the information includes:
obtaining the information, by a device, from a core network component, wherein the device includes:
a central unit (CU); or
a device external to a next generation node B (gNB).

17. The method of claim 11, wherein obtaining the information includes:
determining a first amount of resources consumed at a Central Unit-Control Plane (CU-CP) and a Central Unit-User Plane (CU-UP) for each of the network slices;
determining a second amount of Radio Resource Control (RRC) resources for each of the network slices; and
determining which of the network slices are to be barred based on the information, wherein the information indicates the first amount of resources and the second amount of resources.

18. The method of claim 11, wherein the message includes:
information that indicates, for each of the network slices, what category of access is barred.

19. A non-transitory computer-readable medium, comprising processor-executable instructions, that when executed by one or more processors, cause the processors to:
obtain information that indicates when a plurality of network slices are overloaded;
generate, based on the information, a message that includes:
a slice information array comprising at least one block, which includes:
a Single-Network Slice Selection Assistance Information (S-NSSAI) identifying a network slice,
a barring status which, when set to a first value, indicates that the network slice is barred from access and when set to a second value, indicates that the network slice is allowed access by wireless mobile terminals, and
information identifying a service provided by the network slice corresponding to the S-NSSAI; and
send the message to a distributed unit (DU) to broadcast the message over a wireless signal to a cell.

20. The non-transitory computer-readable medium of claim 19, wherein when the processor obtains the information, the one or more processors are further to:
obtain some of the information from information elements that are sent by an Access and Mobility Function (AMF) in a core network.

* * * * *